US012111030B2

(12) United States Patent
Kim

(10) Patent No.: US 12,111,030 B2
(45) Date of Patent: Oct. 8, 2024

(54) FASTENER FOR LAMP AND LAMP INCLUDING THE SAME

(71) Applicant: HYUNDAI MOBIS CO., LTD., Seoul (KR)

(72) Inventor: Seong Keun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/537,485

(22) Filed: Dec. 12, 2023

(65) Prior Publication Data

US 2024/0191853 A1 Jun. 13, 2024

(30) Foreign Application Priority Data

Dec. 13, 2022 (KR) ........................ 10-2022-0173954

(51) Int. Cl.
*F21S 41/19* (2018.01)

(52) U.S. Cl.
CPC .................................. *F21S 41/198* (2018.01)

(58) Field of Classification Search
CPC ................................ F21S 41/19; F21S 41/198
See application file for complete search history.

(56) References Cited

U.S. PATENT DOCUMENTS

2012/0213580 A1* 8/2012 Omori ..................... F16B 21/08
403/375
2022/0136672 A1* 5/2022 Kellermann .......... F21S 41/151
362/473
2022/0333753 A1* 10/2022 Mudry ................. B60Q 1/2669

* cited by examiner

*Primary Examiner* — Anne M Hines
(74) *Attorney, Agent, or Firm* — MORGAN, LEWIS & BOCKIUS LLP

(57) ABSTRACT

Disclosed is a fastener for a lamp, which is engaged with a pocket part provided in a bracket when being inserted into the pocket part in a first direction, including a first fastening part engaged with the pocket part such that the fastener is prevented from being moved with respect to the bracket in a second direction that is an opposite direction to the first direction when the fastener is inserted into the pocket part, and a second fastening part engaged with the pocket part such that the fastener is prevented from being moved with respect to the bracket in the first direction when the fastener is inserted into the pocket part.

17 Claims, 5 Drawing Sheets

FASTENER FOR LAMP AND LAMP INCLUDING THE SAME

CROSS-REFERENCE TO RELATED APPLICATION

This application claims the benefit of priority to Korean Patent Application No. 10-2022-0173954 filed in the Korean Intellectual Property Office on Dec. 13, 2022, the entire contents of which are incorporated herein by reference.

TECHNICAL FIELD

The present disclosure relates to a fastener for a lamp, and a lamp including the same.

BACKGROUND

In general, a lamp is provided with a light emitting module that outputs light, and a bracket for supporting the light emitting module. Because the light emitting module and the bracket are manufactured separately, a fastener for connecting the light emitting module and the bracket is essentially necessary for the light emitting module to be supported by the bracket. Because one side of the fastener may be fastened to be fixed to the light emitting module and an opposite side thereof is fastened to be fixed to the bracket, the fastener may function to connect the light emitting module and the bracket.

A conventional fastener is provided with a fastener part that may be engaged with one side of a pocket provided in the bracket when being inserted into the pocket, and a shaft that may be fixed to the fastening part and the light emitting module. When the fastener is inserted into the pocket, a side of the fastening part in one direction is a fixed end with respect to the bracket and a side thereof in an opposite direction is formed as a free end with respect to the bracket that is not engaged with the pocket.

Meanwhile, because the opposite side of the fastening part is the free end, the free end is moved with respect to the fixed end of the fastening part when the lamp vibrates or an impact is applied to the lamp. When impacts are consistently accumulated in the fastener due to the motion of the free end of the fastening part, the fastener is damaged. In this way, when the fastener is damaged due to the vibration generated in the lamp or the impact applied to the lamp, the fastening of the light emitting module and the bracket may be released in the housing such that they are separated.

SUMMARY

The present disclosure has been made to solve the above-mentioned problems occurring in the prior art while advantages achieved by the prior art are maintained intact.

An aspect of the present disclosure provides a fastener, of which one side and an opposite side may be engaged with a pocket when the fastener is inserted into the pocket to be formed as a fixed end.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fastener for a lamp, which is engaged with a pocket part provided in a bracket when being inserted into the pocket part in a first direction, includes a first fastening part engaged with the pocket part such that the fastener is prevented from being moved with respect to the bracket in a second direction that is an opposite direction to the first direction when the fastener is inserted into the pocket part, and a second fastening part engaged with the pocket part such that the fastener is prevented from being moved with respect to the bracket in the first direction when the fastener is inserted into the pocket part.

Furthermore, any one of a hole and a boss may be formed in the first fastening part, and the other of the hole and the boss may be formed in the second fastening part.

Furthermore, a fastening hook boss that is a boss engaged with the pocket part is formed in the first fastening part, and the fastening hook boss may extend from an end of the first fastening part in the first direction, in a boss direction that is askew from the first direction.

Furthermore, the fastener may be positioned in a fastening introduction state that is a state, in which the fastening hook boss is disposed in an interior space of the pocket part, and a restoring force may be applied to the fastening hook boss in the boss direction when the fastener is in the coupling introduction state.

Furthermore, the fastener may be further positioned in a fastened state, in which the fastening hook boss is engaged with the pocket part, and the fastening hook boss may be moved with respect to the second fastening part in the boss direction by the restoring force when the fastener is changed from the coupling introduction state to the fastened state.

Furthermore, a fastening hole, into which the pocket part is inserted, may be formed in the second fastening part, and the second fastening part may include a fastening/engaging part engaged with the pocket part when the pocket part is inserted into the fastening hole.

Furthermore, the fastener may be positioned in an insertion progress state, in which a side of the pocket part in the second direction is disposed in the fastening hole, and the fastening/engaging part may press the side of the pocket part in the second direction in a direction that is askew from the second direction when the fastener is in the insertion progress state.

Furthermore, an inclined area that extends to be inclined in the first direction so as to be inclined to an inside of the fastener may be formed on the fastening/engaging part.

Furthermore, the second fastening part may further include a fastening body connected to the fastening/engaging part, and the fastening/engaging part may include a first fastening/engaging part and a second fastening/engaging part that are symmetrical to each other with respect to the fastening body.

Furthermore, the fastener may further include a fastening shaft inserted into the fastening body along the first direction and fixed to the fastening body, the fastening shaft may include a shaft body inserted into the fastening body and surrounded by the fastening body, and a shaft head disposed at an end of the shaft body in the second direction, and the shaft head may be disposed on a side of the fastening body in the second direction.

According to another aspect of the present disclosure, a lamp may include a bracket provided with a pocket part, and a fastener engaged with the pocket part provided in the bracket when being inserted into the pocket part in a first direction, the pocket part may include a first pocket fastening part and a second pocket fastening part, which are engaged with the fastener, and the fastener may include a first fastening part engaged with the first pocket fastening part such that the fastener is prevented from being moved with respect to the bracket in a second direction that is an opposite direction to the first direction when the fastener is inserted into the pocket part, and a second fastening part engaged with the second pocket fastening part such that the fastener is prevented from being moved with respect to the bracket in the first direction when the fastener is inserted into the pocket part.

Furthermore, the lamp may further include a fastening hook boss that is a boss engaged with the first pocket fastening part is formed in the first fastening part, and an end of the first pocket fastening part in the first direction and an end of the fastening hook boss in the second direction may face each other when the first pocket fastening part and the first fastening part are engaged with each other.

Furthermore, the lamp may further include a pocket hook boss that is a boss engaged with the second fastening part is formed in the second pocket fastening part, a fastening hole, into which the second pocket fastening part is inserted, may be formed in the second fastening part, and the second fastening part may include a fastening/engaging part engaged with the pocket hook boss when the pocket hook is inserted into the fastening hole, and an end of the pocket hook boss in the first direction and an end of the fastening/engaging part in the second direction may face each other when the second pocket fastening part and the second fastening part are engaged with each other.

Furthermore, the pocket part may further include a pocket body, in which a pocket guide hole, into which the fastener is inserted, is formed, and a width of the pocket guide hole may become smaller as it goes in the first direction.

Furthermore, the second fastening part may include a fastening body inserted into the pocket guide hole, a guide boss extending in the first direction may be formed on an outer surface of the fastening body, and a pocket guide slit extending in the first direction and into which the guide boss may be inserted when the fastening body is inserted into the pocket guide hole is formed on an inner surface of the pocket body.

Furthermore, the lamp may further include a light emitting module that outputs light, and the fastener may further include fastening shaft fixed to the second fastening part, and a holder connecting the fastening shaft and the light emitting module.

Furthermore, the fastening shaft may include a shaft head connected to the holder, the second fastening part may be disposed on a side of the first fastening part in the second direction, and the shaft head may be disposed on the second fastening part in the second direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
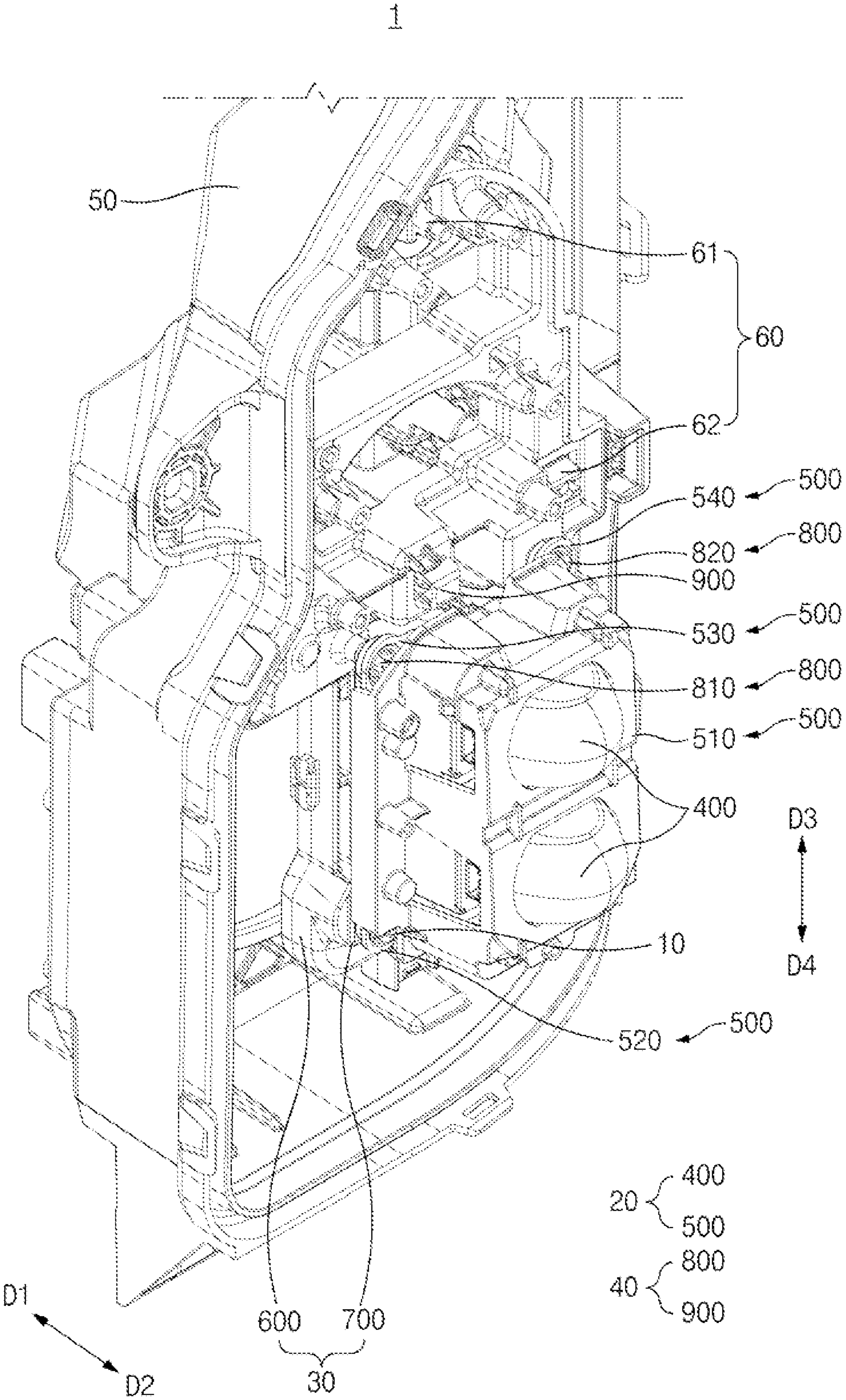
FIG. 1 is a perspective view of a lamp according to the present disclosure.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. When it is described that a component is "connected to", "fastened to", or "inserted into" another component, it should be understood that the former component may be directly connected to, fastened to, or connected to the latter component, but a third component may be "connected", "fastened", or "inserted" between the components.

Hereinafter, a lamp 1 according to the present disclosure will be described with reference to the drawings.

Referring to FIG. 1, the lamp 1 may output light to an outside. Furthermore, the lamp 1, for example, may include a rear lamp that provides information to a person located outside a vehicle, and a headlamp that secures a visibility of a driver. The lamp 1 may include a fastener 10, a light emitting module 20, a bracket 30, a pivot unit 40, a lamp housing 50, and an aiming bolt 60.

Figure 2:
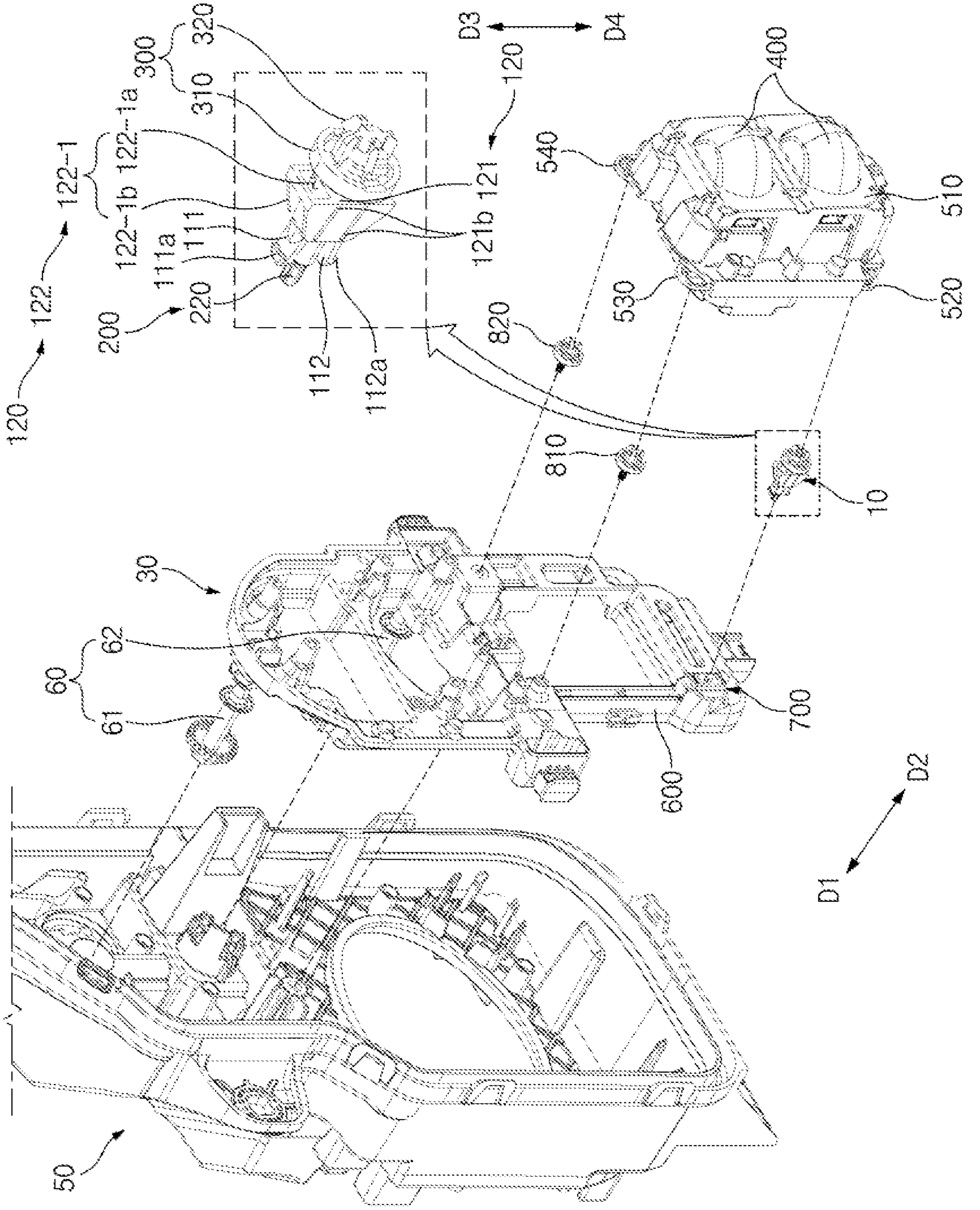
FIG. 2 is an exploded perspective view of a lamp according to the present disclosure.

Referring further to FIG. 2, the fastener 10 may connect the light emitting module 20 and the bracket 30. For example, a side of the fastener 10 in a first direction D1 may be inserted into a pocket part 700 provided in the bracket 30, which will be described below. Furthermore, a side of the fastener 10 in a second direction D2 may be fixed to the light emitting module 20. The first direction D1 may be defined as a direction, in which the light emitting module 20 faces the bracket 30. The second direction D2 may be defined as an opposite direction to the first direction D1. The fastener 10 may include a fastening part 100, a fastening shaft 200, and a holder 300.

The fastening part 100 may include a first fastening part 110 and a second fastening part 120. The first fastening part 110 may prevent the fastener 10 from being moved with respect to the bracket 30 in the second direction D2 when the fastener 10 is inserted into the pocket part 700. For example, the first fastening part 110 may be engaged with a side of the pocket part 700 in the first direction D1. Furthermore, the first fastening part 110 may extend from an end of the second fastening part 120 in the first direction D1, in the first direction D1. The first fastening part 110 and the pocket part 700, for example, may be fastened with each other in a snap-fit scheme. The first fastening part 110 may include a first fastening hook 111 and a second fastening hook 112.

Figure 3:
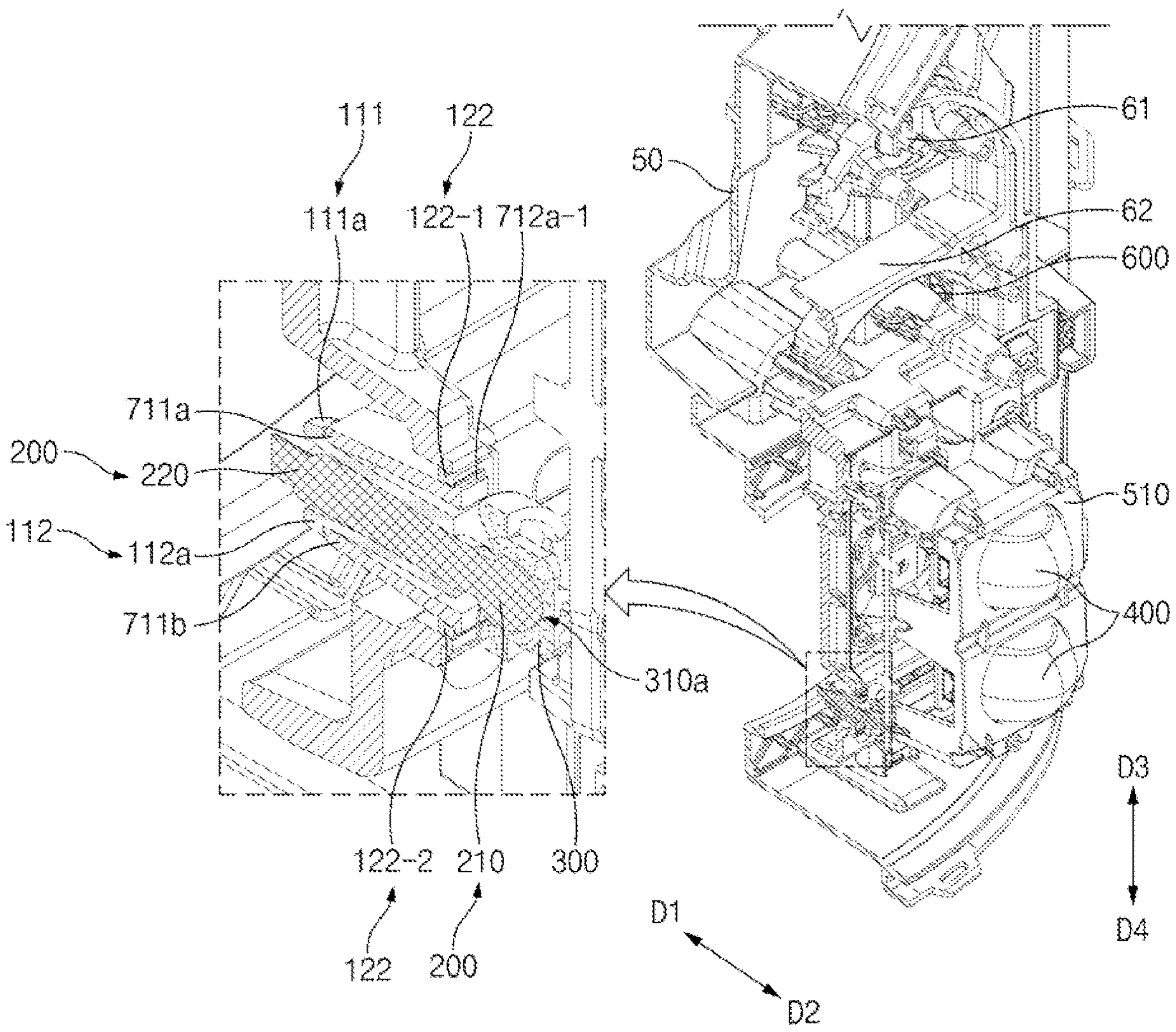
FIG. 3 is a cross-sectional perspective view of a lamp according to the present disclosure.

Referring further to FIG. 3, the first fastening hook 111 may extend from the second fastening part 120 in the first direction D1. For example, the first fastening hook 111 may have a shape that is inclined with respect to the first direction D1 in a third direction D3. In a more detailed example, an end of the first fastening hook 111 in the first direction D1 may be disposed on a side of an end thereof in the second direction D2, in the third direction D3. The third direction D3 may be defined as a direction that is perpendicular to the first direction D1 and becomes farther from the first fastening part 110. Furthermore, a fourth direction D4 may be defined as an opposite direction to the third direction D3. An end of the first fastening hook 111 in the first direction D1 may be formed as a free end with respect to the second fastening part 120. Furthermore, an end of the first fastening hook 111 in the second direction D2 may be formed as a fixed end with respect to the second fastening part 120. A first fastening hook boss 111*a* may be formed at an end of the first fastening hook 1111 in the first direction D1.

The first fastening hook boss 111*a* may extend from an end thereof in the first direction D1 in a first boss direction that is askew from the first direction D1. For example, the first boss direction may be the third direction D3. A curved surface having a shape that is convex in the first direction D1 may be provided on a side of the first fastening hook boss 111*a* in the first direction D1. Furthermore, an inclined surface may be provided on a side of the first fastening hook boss 111*a* in the second direction D2. For example, the inclined surface of the first fastening hook boss 111*a* may extend in the third direction D3 to be inclined in the second direction D2. In a more detailed example, a side of the inclined surface of the first fastening hook boss 111*a* in the third direction D3 may be disposed in the second direction rather than in the fourth direction D4.

Furthermore, a width of a side of the first fastening hook boss 111*a* in the first direction D1 may be smaller than a width of a side thereof in the second direction D2. For example, the first fastening hook boss 111*a* may have a shape, a width of which becomes smaller as it goes in the first direction D1. A widthwise direction (hereinafter, the widthwise direction) of the first fastening hook boss 111*a* may be defined as a direction that is perpendicular to the first direction D1, the second direction D2, the third direction D3, and the fourth direction D4. The first fastening hook 111 and the first fastening hook boss 111*a* may be named 'a first snap fitter'.

The second fastening hook 112 may extend from the second fastening part 120 in the first direction D1. For example, the second fastening hook 112 may have a shape that is inclined with respect to the first direction D1 in the fourth direction D4. In a more detailed example, an end of the second fastening hook 112 in the first direction D1 may be disposed on a side of an end thereof in the second direction D2, in the fourth direction D4. An end of the second fastening hook 112 in the first direction D1 may be formed as a free end with respect to the second fastening part 120. Furthermore, an end of the second fastening hook 112 in the second direction D2 may be formed as a fixed end with respect to the second fastening part 120. The second fastening hook 112 and the first fastening hook 111 may be provided to be symmetrical to each other with respect to a reference plane. The reference plane may be defined as an imaginary plane that is perpendicular to the third direction D3 and passes through a center of the fastening part 100. A second fastening hook boss 112*a* may be formed at an end of the second fastening hook 112 in the first direction D1.

The second fastening hook boss 112*a* may extend from an end thereof in the first direction D1 in a second boss direction that is askew from the first direction D1. For example, the second boss direction may be the fourth direction D4. A curved surface having a shape that is convex in the first direction D1 may be provided on a side of the second fastening hook boss 112*a* in the first direction D1. Furthermore, an inclined surface may be provided on a side of the second fastening hook boss 112*a* in the second direction D2. For example, an inclined surface of the second fastening hook boss 112*a* may extend in the fourth direction D4 to be inclined in the second direction D2. In a more detailed example, a side of the inclined surface of the second fastening hook boss 112*a* in the fourth direction D4 may be disposed on a side thereof in the second direction D2 rather than in the third direction D3.

Furthermore, a width of a side of the second fastening hook boss 112*a* in the first direction D1 may be smaller than a width thereof in the second direction D2. For example, the second fastening hook boss 112*a* may have a shape, a width of which becomes smaller as it goes in the first direction D1. The second fastening hook 112 and the second fastening hook boss 112*a* may be named 'a second snap fitter'.

Furthermore, when the fastener 10 is in a fastening introduction state, a restoring force may be applied to the first fastening hook boss 111*a* and the second fastening hook boss 112*a* in a restoration direction. For example, when the fastener 10 is in the fastening introduction state, the first fastening hook boss 111*a* and the second fastening hook boss 112*a* may be moved with respect to the second fastening part 120, in an extension direction. The extension direction may be defined as a direction, in which the first fastening hook boss 111*a* and the second fastening hook boss 112*a* becomes farther away from each other, and a contraction direction may be defined as an opposite direction to the extension direction. Furthermore, the fastening introduction state may be defined as a state, in which the first fastening hook boss 111*a* and the second fastening hook boss 112*a* are disposed in an interior space (a pocket guide hole 720*b* that will be described below) of the pocket part 700. In other words, when the fastener 10 is in the fastening introduction state, a restoring force is applied to the first fastening hook boss 111*a* in the first boss direction (the third direction D3), and a restoring force may be applied to the second fastening hook boss 112*a* in the second boss direction (the fourth direction D4).

Furthermore, when the fastener 10 is changed from the fastening introduction state to the fastened state, the first fastening hook boss 111*a* and the second fastening hook boss 112*a* may be moved with respect to the second fastening part 120 in a restoration direction by a restoring force. The fastened state may be defined as a state, in which the fastener 10 and the pocket part 700 are engaged with each other. For example, when the fastener 10 is changed from the fastening introduction state to the fastened state, the first fastening hook boss 111*a* may be moved with respect to the second fastening part 120 in the first boss direction, and the second fastening hook boss 112*a* may be moved with respect to the second fastening part 120 in the second boss direction.

The second fastening part 120 may prevent the fastener 10 from being moved with respect to the bracket 30 in the first direction D1 when the fastener 10 is inserted into the pocket part 700. For example, the second fastening part 120 may be engaged with a side of the pocket part 700 in the second direction D2. Furthermore, the second fastening part 120 and the pocket part 700, as an example, may be fastened with each other in a snap-fit scheme. The second fastening part 120, as an example, may be integrally formed with the first fastening part 110. The second fastening part 120 may include a fastening body 121 and a fastening/engaging part 122.

The fastening body 121 may be connected to the fastening/engaging part 122. The fastening body 121, as an example, may be integrally formed with the fastening/engaging part 122. A shaft hole 121*a* and a guide boss 121*b* may be formed in the fastening body 121.

Figure 4:
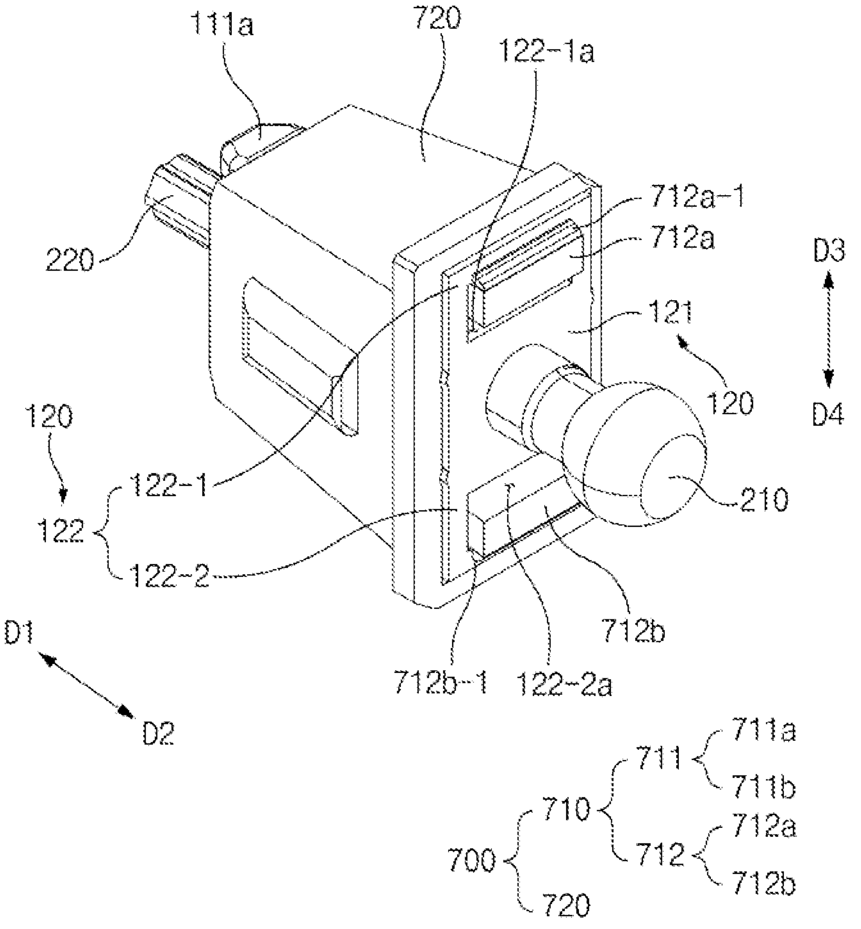
FIG. 4 is a view illustrating a state, in which a fastener for a lamp and a pocket part are fastened with each other, according to the present disclosure.
Figure 5:
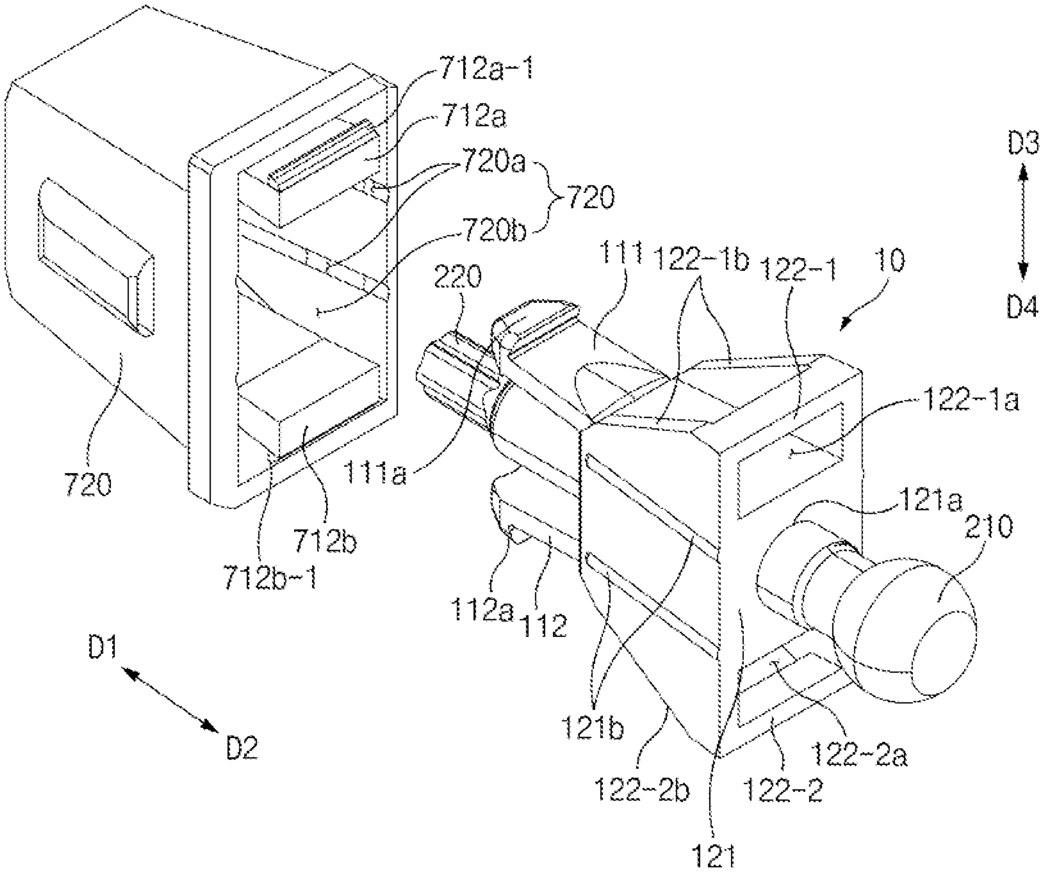
FIG. 5 is a view illustrating a state, in which fastener for a lamp and a pocket part are separated from each other, according to the present disclosure.

Referring to FIGS. 4 and 5, a shaft body 220 that will be described below may be inserted into the shaft hole 121*a*. The shaft hole 121*a* may extend in the first direction D1. The shaft hole 121*a* may be surrounded by the fastening body 121.

Guide bosses 121*b* may be formed on opposite side surfaces of the shaft body 220 in a widthwise direction. The guide bosses 121*b* may extend in the first direction D1. The guide bosses 121*b* may have shapes that protrude in directions that become farther away from the opposite side surfaces of the shaft body 220.

Furthermore, a plurality of guide bosses 121*b* may be provided. For example, some of the plurality of guide bosses 121*b* may be formed on one side surface of the shaft body 220 in the widthwise direction, and some may be formed on an opposite side surface of the shaft body 220 in the widthwise direction. The opposite side surface of the shaft body 220 in the widthwise direction may mean an opposite side surface to the one side surface of the shaft body 220 in the widthwise direction. In a more detailed example, two guide bosses 121*b* may be formed on the one side surface of the shaft body 220 in the widthwise direction, and two guide bosses 121*b* may be formed on the opposite side surface of the shaft body 220 in the widthwise direction. However, the present disclosure is not limited to the example, and three or more guide bosses 121*b* may be formed on the one side surface of the shaft body 220 in the widthwise direction, and three or more guide bosses 121*b* may be formed on the opposite side surface of the shaft body 220 in the widthwise direction.

The fastening/engaging part 122 may be engaged with a second pocket fastening body 712 that will be described below. The fastening/engaging part 122 may include a first fastening/engaging part 122-1 and a second fastening/engaging part 122-2. The first fastening/engaging part 122-1 may be engaged with a first pocket hook 712*a* that will be described below. The first fastening/engaging part 122-1 may extend from the first fastening hook 111 in the second direction D2. Furthermore, the first fastening/engaging part 122-1 may be disposed on a side of the fastening body 121 in the third direction D3. A first fastening hole 122-1*a* and a first inclined area 122-1*b* may be formed in the first fastening/engaging part 122-1.

A pocket hook 712*a* may be inserted into the first fastening hole 122-1*a*. For example, when the first pocket hook 712*a* is inserted into the first fastening hole 122-1*a*, the first fastening/engaging part 122-1 and the first pocket hook 712*a* may be engaged with each other. The first fastening hole 122-1*a* may extend in the second direction D2. The first fastening hole 122-1*a* may be surrounded by the first fastening/engaging part 122-1.

Referring back to FIG. 5, the first inclined area 122-1*b* may extend toward an inside of the fastener 10 in the first direction D1. For example, the first inclined area 122-1*b* may extend to be inclined in the first direction D1 to be inclined in the fourth direction D4. The first inclined area 122-1*b* may be disposed on a side of the first fastening hole 122-1*a* in the first direction D1. Furthermore, a plurality of first inclined areas 122-1*b* may be provided.

For example, the plurality of first inclined areas 122-1*b* may be arranged to be spaced apart from each other in the widthwise direction. Sides of the plurality of first inclined areas 122-1*b* in the third direction D3 may be opened with respect to an outside of the fastener 10. First inclined spaces that are communicated with the first fastening hole 122-1*a* may be formed between the plurality of first inclined areas 122-1*b*. The first inclined spaces, as an example, may have a triangular column shape. For example, when the fastener 10 is viewed along the widthwise direction, the first inclined spaces may have a shape, of which a length in the third direction D3 becomes larger as it goes in the second direction D2.

The second fastening/engaging part 122-2 may be engaged with a second pocket hook 712*b* that will be described below. The second fastening/engaging part 122-2 may extend from the second fastening hook 112 in the second direction D2. Furthermore, the second fastening/engaging part 122-2 may be disposed on a side of the fastening body 121 in the fourth direction D4. A second fastening hole 122-2*a* and a second inclined area 122-2*b* may be formed in the second fastening/engaging part 122-2.

The second pocket hook 712*b* may be inserted into the second fastening hole 122-2*a*. For example, when the second pocket hook 712*b* is inserted into the second fastening hole 122-2*a*, the second fastening/engaging part 122-2 and the second pocket hook 712*b* may be engaged with each other. The second fastening hole 122-2*a* may extend in the second direction D2. The second fastening hole 122-2*a* may be surrounded by the second fastening/engaging part 122-2.

The second inclined area 122-2*b* may extend to be inclined in the first direction D1 toward an inside of the fastener 10. For example, the second inclined area 122-2*b* may extend to be inclined in the first direction D1 to be inclined in the third direction D3. The second inclined area 122-2*b* may be disposed on a side of the second fastening hole 122-2*a* in the first direction D1. Furthermore, a plurality of second inclined areas 122-2*b* may be provided.

For example, the plurality of second inclined areas 122-2*b* may be arranged to be spaced apart from each other in the widthwise direction. Sides of the plurality of second inclined areas 122-2*b* in the fourth direction D4 may be opened with respect to the outside of the fastener 10. Second inclined spaces that are communicated with the second fastening hole 122-2*a* may be formed between the plurality of second inclined areas 122-2*b*. The second inclined spaces, as an example, may have a triangular column shape. For example, when the fastener 10 is viewed along the widthwise direction, the second inclined spaces may have a shape, of which a length in the fourth direction D4 becomes larger as it goes in the second direction D2.

The fastening shaft 200 may pass through and be inserted into the second fastening part 120. For example, the fastening shaft 200 may be inserted into the second fastening part 120 along the first direction D1. The fastening shaft 200 may be fixed to the fastening part 100 while being inserted into the second fastening part 120. The fastening shaft 200 may include a shaft head 210 and the shaft body 220.

The shaft head 210 may be connected to a side of the shaft body 220 in the second direction D2. Furthermore, the shaft head 210 may be connected to the holder 300. For example, a side of the shaft head 210 in the first direction D1 may be connected to the shaft body 220, and a side thereof in the second direction D2 may be connected to the holder 300. Furthermore, when the fastening shaft 200 is inserted into the second fastening part 120, the shaft head 210 may be disposed on a side of the second fastening part 120 in the second direction D2. The shaft head 210, as an example, may have a ball shape. Furthermore, the shaft head 210, as an example, may be integrally formed with the shaft body 220.

The shaft body 220 may be inserted into the second fastening part 120 in the first direction D1, and may be fixed to the second fastening part 120. For example, the shaft body 220 may be inserted into the shaft hole 121*a*. Furthermore, an end of the shaft body 220 in the first direction D1 may be disposed on a side of the first fastening part 110 in the first direction D1. The shaft body 220 may extend in the first direction D1.

The holder 300 may connect the shaft head 210 and the light emitting module 20. The holder 300 may be disposed between the shaft head 210 and the light emitting module 20. The holder 300 may include a holder body 310 and a holder hook 320.

The holder body 310 may be fixed to the shaft head 210. A head hole 310*a* may be formed in the holder body 310. The shaft head 210 may be inserted into the head hole 310*a*. For example, when the shaft head 210 is inserted into the head hole 310*a*, the shaft head 210 may be fixed to the holder body 310. The head hole 310*a* may extend in the second direction D2.

The holder hook 320 may be provided on a side of the holder body 310 in the second direction D2. The holder hook 320 may be engaged with the light emitting module 20. For example, when the shaft head 210 is inserted into the head hole 310*a* and the holder hook 320 is engaged with the light emitting module 20, the light emitting module 20 may be fixed to the fastener 10.

Referring back to FIG. 2, the light emitting module 20 may include a light emitting part 400 and a light emitting housing 500. The light emitting part 400 may output light. The light emitting part 400, as an example, includes a light source, a lens, and the like, and is a configuration corresponding to a conventional technology of outputting light, and detailed contents related thereto will be omitted.

The light emitting housing 500 may define an external appearance of the light emitting module 20. The light emitting housing 500 may include a light emitting body 510, a fastener inserting part 520, a first pivot inserting part 530, and a second pivot inserting part 540. The light emitting body 510 may support the light emitting part 400.

The fastener 10 may be inserted into the fastener inserting part 520. A hole, into which the holder 300 may be inserted, may be formed in the fastener inserting part 520. For example, when the holder 300 is inserted into a hole formed in the fastener inserting part 520, the fastener inserting part 520 may be engaged with the holder hook 320. The fastener inserting part 520 may be disposed at a periphery of the light emitting body 510. For example, the fastener inserting part 520 may be disposed on a side of the periphery of the light emitting body 510 in the fourth direction D4.

A first light emitting pivot 810 that will be described below may be inserted into the first pivot inserting part 530. The first pivot inserting part 530 may be disposed to be spaced apart from the fastener inserting part 520 in the third direction D3. That is, the first pivot inserting part 530 may be disposed on a side of a periphery of the light emitting body 510 in the third direction D3.

A second light emitting pivot 820 that will be described below may be inserted into the second pivot inserting part 540. The second pivot inserting part 540 may be disposed on a side of the periphery of the light emitting body 510 in the third direction D3. For example, the second pivot inserting part 540 may be disposed to be spaced apart from the first pivot inserting part 530 in the widthwise direction.

The bracket 30 may support the light emitting module 20. Furthermore, the bracket 30 may be supported by the lamp housing 50. The bracket 30 may be disposed between the light emitting module 20 and the lamp housing 50. The bracket 30 may include a bracket body 600 and the pocket part 700. The bracket body 600 may define an external appearance of the bracket 30. The bracket body 600, as an example, may be integrally formed with the pocket part 700.

The pocket part 700 may be fastened with the fastener 10. The pocket part 700 may be disposed on a side of the bracket body 600 in the fourth direction D4. The pocket part 700 may include a pocket fastening part 710 and a pocket body 720.

Referring to FIGS. 4 and 5, the pocket fastening part 710 may be engaged with the fastening part 100. The pocket fastening part 710 may include a first pocket fastening body 711 and the second pocket fastening body 712. The first pocket fastening body 711 may be engaged with the first fastening part 110. The first pocket fastening body 711 may include a first pocket engaging part 711*a* and a second pocket engaging part 711*b*.

The first pocket engaging part 711*a* may be engaged with the first fastening hook 111. The first pocket engaging part 711*a* may be connected to the pocket body 720. Furthermore, the first pocket engaging part 711*a* may be disposed on a side of the second pocket fastening body 712 in the first direction D1. An inclined surface may be provided on an end of the first pocket engaging part 711*a* in the first direction D1. For example, the inclined surface of the first pocket engaging part 711*a* may extend in the third direction D3 to be inclined in the second direction D2. In a more detailed example, a side of the inclined surface of the first pocket engaging part 711*a* in the third direction D3 may be disposed in the second direction D2 rather than in the fourth direction D4. When the fastener 10 is in the fastened state, the inclined surface of the first fastening hook boss 111*a* and the inclined surface of the first pocket engaging part 711*a* may face each other. By the inclined surface of the first fastening hook boss 111*a* and the inclined surface of the first pocket engaging part 711*a*, the first pocket engaging part 711*a* and the first fastening hook 111 may be engaged with each other more firmly.

The second pocket engaging part 711*b* may be engaged with the second fastening hook 112. The second pocket engaging part 711*b* may be connected to the pocket body 720. Furthermore, the second pocket engaging part 711*b* may be disposed on a side of the second pocket fastening body 712 in the first direction D1. An inclined surface may be provided on an end of the second pocket engaging part 711*b* in the first direction D1. For example, the inclined surface of the second pocket engaging part 711*b* may extend in the fourth direction D4 to be inclined in the second direction D2. In a more detailed example, a side of the inclined surface of the second pocket engaging part 711*b* in the fourth direction D4 may be disposed on a side thereof in the second direction rather than in the third direction D3. When the fastener is in the fastened state, the inclined surface of the second fastening hook boss 112*a* and the inclined surface of the second pocket engaging part 711*b* may face each other. By the inclined surface of the second fastening hook boss 112*a* and the inclined surface of the second pocket engaging part 711*b*, the second pocket engaging part 711*b* and the second fastening hook 112 may be engaged with each other more firmly.

The second pocket fastening body 712 may include the first pocket hook 712*a* and the second pocket hook 712*b*. The first pocket hook 712*a* may be engaged with the first fastening/engaging part 122-1. The first pocket hook 712*a* may extend from the first pocket engaging part 711*a* in the second direction D2. For example, the first pocket hook 712*a* may have a shape that is inclined with respect to the second direction D2 in the third direction D3. In a more detailed example, an end of the first pocket hook 712*a* in the second direction D2 may be disposed on a side of an end thereof in the first direction D1, in the third direction D3. The first pocket hook 712*a*, as an example, may be integrally formed with the first pocket engaging part 711*a*. A first pocket hook boss 712*a*-1 may be formed at an end of the first pocket hook 712*a* in the second direction D2.

The first pocket hook boss 712*a*-1 may extend in the third direction D3. The first pocket hook boss 712*a*-1 may be disposed on a side of the first fastening hook boss 111*a* in the third direction D3. Furthermore, a curved surface having a shape that is convex in the second direction D2 may be provided on a side of the first pocket hook boss 712*a*-1 in the second direction D2. Furthermore, when the first pocket hook 712*a* and the first fastening/engaging part 122-1 are engaged with each other, an end of the first pocket hook boss 712*a*-1 in the first direction D1 and an end of the first fastening/engaging part 122-1 in the second direction D2 may face each other.

The second pocket hook 712*b* may be engaged with the second fastening/engaging part 122-2. The second pocket hook 712*b* may extend from the second pocket engaging part 711*b* in the second direction D2. For example, the second pocket hook 712*b* may have a shape that is inclined with respect to the second direction D2 in the fourth direction D4. In a more detailed example, an end of the second pocket hook 712*b* in the second direction D2 may be disposed on a side of the end thereof in the first direction D1, in the fourth direction D4. The second pocket hook 712*b*, as an example, may be integrally formed with the second pocket engaging part 711*b*. The second pocket hook 712*b* and the first pocket hook 712*a* may be provided to be symmetrical to each other with respect to a reference plane. A second pocket hook boss 712*b*-1 may be formed at an end of the second pocket hook 712*b* in the second direction D2.

The second pocket hook boss 712*b*-1 may extend in the fourth direction D4. The second pocket hook boss 712*b*-1 may be disposed on a side of the second fastening hook boss 112*a* in the fourth direction D4. Furthermore, a curved surface having a shape that is convex in the second direction D2 may be provided on a side of the second pocket hook boss 712*b*-1 in the second direction D2. Furthermore, when the second pocket hook 712*b* and the second fastening/engaging part 122-2 are engaged with each other, an end of the second pocket hook boss 712*b*-1 in the first direction D1 and an end of the second fastening/engaging part 122-2 in the second direction D2 may face each other.

Furthermore, when the fastener 10 is in the fastening introduction state, a restoring force may be applied to the first pocket hook boss 712*a*-1 and the second pocket hook boss 712*b*-1 in a restoration direction. For example, when the fastener 10 is in the fastening introduction state, the first pocket hook boss 712*a*-1 and the second pocket hook boss 712*b*-1 may be moved with respect to the pocket body 720 in the extension direction. Furthermore, when the fastener 10 is in the fastening introduction state, a restoring force may be applied to the first pocket hook boss 712*a*-1 in the first boss direction, and a restoring force may be applied to the second pocket hook boss 712*b*-1 in the second boss direction.

Furthermore, when the fastener 10 is changed from the fastening introduction state to the fastened state, the first pocket hook boss 712*a*-1 and the second pocket hook boss 712*b*-1 may be moved with respect to the pocket body 720 in the restoration direction by the restoring force. For example, when the fastener is changed from the fastening introduction state to the fastened state, the first pocket hook boss 712*a*-1 may be moved with respect to the pocket body 720 in the first boss direction, and the second pocket hook boss 712*b*-1 may be moved with respect to the pocket body 720 in the second boss direction.

The pocket body 720 may support the pocket fastening part 710. The pocket body 720, as an example, may be integrally formed with the pocket fastening part 710. Furthermore, the pocket body 720 may have a shape that surrounds the pocket fastening part 710. A pocket guide slit 720*a* and the pocket guide hole 720*b* may be formed in the pocket body 720.

The pocket guide slit 720*a* may guide movement of the fastener 10 when the fastener 10 is inserted into the pocket part 700. The pocket guide slit 720*a* may extend in the first direction D1. Furthermore, when the fastening body 121 is inserted into the pocket guide hole 720*b*, the guide boss 121*b* may be inserted into the pocket guide slit 720*a*. The pocket guide slit 720*a* may be formed on an inner surface of the pocket body 720. For example, the pocket guide slit 720*a* may be a groove that is recessed on the inner surface of the pocket body 720. Furthermore, the inner surface of the pocket body 720 may be defined as a surface that surrounds the pocket guide hole 720*b*.

The pocket guide slit 720*a* may have a shape corresponding to that of the guide boss 121*b*. For example, a plurality of pocket guide slits 720*a* may be provided. Among the plurality of pocket guide slits 720*a*, two of them may be provided on one side in the widthwise direction and two of them may be provided on an opposite side in the widthwise direction. In other words, the number of the pocket guide slits 720*a* may be the same as the number of the guide bosses 121*b*. When the fastener 10 is in the fastened state, the fastener 10 may be effectively prevented from being moved with respect to the pocket part 700 in the third direction D3 and the fourth direction D4 through the pocket guide slit 720*a*.

The pocket guide hole 720*b* may be defined as a space, into which the fastener 10 may be inserted. The pocket guide hole 720*b* may extend in the first direction D1. Furthermore, the pocket guide hole 720*b*, as an example, may have a shape, of which a length in the widthwise direction becomes smaller as it goes in the first direction D1. In a more detailed example, when the pocket part 700 is viewed along the third direction D3, the pocket guide hole 720*b* may have a trapezoidal shape, of which a length of a side thereof in the first direction D1 in the widthwise direction is smaller than a length of a side thereof in the second direction D2 in the widthwise direction.

Furthermore, the pocket guide hole 720*b*, as an example, may have a shape, of which a length in the third direction D3 becomes smaller as it goes in the first direction D1. In a more detailed example, when the pocket part 700 is viewed along the widthwise direction, the pocket guide hole 720*b* may have a trapezoidal shape, of which a length of a side thereof in the first direction D1 in the third direction D3 is smaller than a length of a side thereof in the second direction D2 in the third direction D3. Through the shape of the pocket guide hole 720*b*, when the fastener 10 is in the fastened state, the fastener 10 may be effectively prevented from being moved with respect to the pocket part 700 in the first direction D1.

The pivot unit 40 may include a light emitting pivot 800 and a bracket pivot 900. The light emitting pivot 800 may enhance a matching performance of fastening of the light emitting module and the bracket 30 when the light emitting module 20 and the bracket 30 are fastened to each other. The light emitting pivot 800 may be disposed between the bracket 30 and the light emitting module 20. The light emitting pivot 800 may include the first light emitting pivot 810 and the second light emitting pivot 820.

A side of the first light emitting pivot 810 in the first direction D1 may be connected to the bracket 30, and a side thereof in the second direction D2 may be connected to the first pivot inserting part 530. Furthermore, a side of the second light emitting pivot 820 in the first direction D1 may be connected to the bracket 30, and a side thereof in the second direction D2 may be connected to the second pivot inserting part 540.

The bracket pivot 900 may connect the bracket 30 and the lamp housing 50. A side of the bracket pivot 900 in the first direction D1 may be connected to the lamp housing 50, and a side thereof in the second direction D2 may be connected to the bracket 30.

The lamp housing 50 may define an external appearance of the lamp 1. The lamp housing 50 may support the light emitting module 20 and the bracket 30 when the fastener 10 is in the fastened state.

The aiming bolt 60 may enhance a matching performance of fastening of the bracket 30 and the lamp housing 50 when the bracket 30 and the lamp housing 50 are fastened to each other. The aiming bolt 60 may include a first aiming bolt 61 and a second aiming bolt 62.

A side of the first aiming bolt 61 in the first direction D1 may be connected to the lamp housing 50, and a side thereof in the second direction D2 may be connected to the bracket 30. Furthermore, a side of the second aiming bolt 62 in the first direction D1 may be connected to the lamp housing 50, and a side thereof in the second direction D2 may be connected to the bracket 30. The first aiming bolt 61, the second aiming bolt 62, and the bracket pivot 900 may be arranged to be spaced apart from each other.

The fastener according to the present disclosure may minimize a possibility of damage even when a lamp vibrates or an impact is applied to the lamp as it is formed as a fixed end with respect to the bracket as one side and an opposite side thereof are engaged with the pocket.

Even when it has been described above that all the components that constitute the embodiments of the present disclosure are combined into one or are combined to be operated, the present disclosure is not limited to the embodiments. That is, all the components may be selectively combined into one to be operated with a range of the purpose of the present disclosure. Further, because the above-described terms, such as “comprising”, “including”, or “having” mean that the corresponding components may be included unless particularly described in an opposite way, it should be construed that another component is not excluded but may be further included. Unless defined differently, all the terms including technical or scientific terms have the same meanings as those generally understood by an ordinary person in the art, to which the present disclosure pertains. The generally used terms such as the terms defined in advance should be construed to coincide with the context meanings of the related technologies, and should not be construed as ideal or excessively formal meanings unless defined explicitly in the present disclosure. The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A fastener for a lamp, which is engaged with a pocket part provided in a bracket when inserted into the pocket part in a first direction, the fastener comprising:

a first fastening part configured to engage with the pocket part such that the fastener is prevented from being moved with respect to the bracket in a second direction that is an opposite direction to the first direction when the fastener is inserted into the pocket part; and a second fastening part configured to engage with the pocket part such that the fastener is prevented from being moved with respect to the bracket in the first direction when the fastener is inserted into the pocket part.

2. The fastener of claim 1, wherein any one of a hole and a boss is formed in the first fastening part, and wherein another of the hole and the boss is formed in the second fastening part.

3. The fastener of claim 2, wherein a fastening hook boss that is a boss configured to engage with the pocket part is formed in the first fastening part, and wherein the fastening hook boss extends from an end of the first fastening part in the first direction, in a boss direction that is askew from the first direction.

4. The fastener of claim 3, wherein the fastener is positioned in a fastening introduction state, that is a state in which the fastening hook boss is disposed in an interior space of the pocket part, and wherein a restoring force is applied to the fastening hook boss in the boss direction when the fastener is in the fastening introduction state.

5. The fastener of claim 4, wherein the fastener is further positioned in a fastened state, in which the fastening hook boss is engaged with the pocket part, and wherein the fastening hook boss is configured to move with respect to the second fastening part in the boss direction by the restoring force when the fastener is changed from the fastening introduction state to the fastened state.

6. The fastener of claim 2, wherein a fastening hole, into which the pocket part is inserted, is formed in the second fastening part, and the second fastening part includes a fastening/engaging part configured to engage with the pocket part when the pocket part is inserted into the fastening hole.

7. The fastener of claim 6, wherein the fastener is positioned in an insertion progress state, in which a side of the pocket part in the second direction is disposed in the fastening hole, and wherein the fastening/engaging part is configured to press the side of the pocket part in the second direction in a direction that is askew from the second direction when the fastener is in the insertion progress state.

8. The fastener of claim 6, wherein an inclined area that in configured to be inclined in the first direction so as to be inclined to an inside of the fastener is formed on the fastening/engaging part.

9. The fastener of claim 6, wherein the second fastening part further includes a fastening body connected to the fastening/engaging part, and wherein the fastening/engaging part includes a first fastening/engaging part and a second fastening/engaging part that are symmetrical to each other with respect to the fastening body.

10. The fastener of claim 9, further comprising:

a fastening shaft configured to be inserted into the fastening body along the first direction and fixed to the fastening body, wherein the fastening shaft includes:

a shaft body configured to be inserted into the fastening body and surrounded by the fastening body; and a shaft head disposed at an end of the shaft body in the second direction, and wherein the shaft head is disposed on a side of the fastening body in the second direction.

11. A lamp comprising:

a bracket provided with a pocket part; and a fastener configured to engage with the pocket part provided in the bracket when being inserted into the pocket part in a first direction, wherein the pocket part includes a first pocket fastening part and a second pocket fastening part, which are configured to engage with the fastener, and wherein the fastener includes:

a first fastening part configured to engage with the first pocket fastening part such that the fastener is prevented from being moved with respect to the bracket in a second direction that is an opposite direction to the first direction when the fastener is inserted into the pocket part; and a second fastening part configured to engage with the second pocket fastening part such that the fastener is prevented from being moved with respect to the bracket in the first direction when the fastener is inserted into the pocket part.

12. The lamp of claim 11, wherein a fastening hook boss that is a boss configured to engage with the first pocket fastening part is formed in the first fastening part, and wherein an end of the first pocket fastening part in the first direction and an end of the fastening hook boss in the second direction face each other when the first pocket fastening part and the first fastening part are engaged with each other.

13. The lamp of claim 11, wherein a pocket hook boss that is a boss configured to engage with the second fastening part is formed in the second pocket fastening part, wherein a fastening hole, into which the second pocket fastening part is inserted, is formed in the second fastening part, and the second fastening part includes a fastening/engaging part configured to engage with the pocket hook boss when a pocket hook is inserted into the fastening hole, and wherein an end of the pocket hook boss in the first direction and an end of the fastening/engaging part in the second direction face each other when the second pocket fastening part and the second fastening part are engaged with each other.

14. The lamp of claim 11, wherein the pocket part further includes a pocket body, in which a pocket guide hole, into which the fastener is inserted, is formed, and wherein a width of the pocket guide hole becomes smaller as it goes in the first direction.

15. The lamp of claim 14, wherein the second fastening part includes a fastening body inserted into the pocket guide hole, wherein a guide boss extending in the first direction is formed on an outer surface of the fastening body, and wherein a pocket guide slit extending in the first direction and into which the guide boss is inserted when the fastening body is inserted into the pocket guide hole is formed on an inner surface of the pocket body.

16. The lamp of claim 11, further comprising:

a light emitting module configured to output light, wherein the fastener further includes:

a fastening shaft fixed to the second fastening part; and a holder configured to connect the fastening shaft and the light emitting module.

17. The lamp of claim 16, wherein the fastening shaft includes a shaft head configured to connect to the holder, wherein the second fastening part is disposed on a side of the first fastening part in the second direction, and wherein the shaft head is disposed on a side of the second fastening part in the second direction.

* * * * *